(12) United States Patent
Chen (10) Patent No.: US 10,824,035 B2
(45) Date of Patent: Nov. 3, 2020

(54) LIQUID CRYSTAL DISPLAY PANEL HAVING PHOTO SPACER AND MANUFACTURING METHOD THEREOF

(71) Applicants: HKC Corporation Limited, Shenzhen (CN); Chongqing HKC Optoelectronics Technology Corporation Limited, Chongqing (CN)

(72) Inventor: Yu-Jen Chen, Chongqing (CN)

(73) Assignees: HKC CORPORATION LIMITED, Shenzhen (CN); CHONGQING HKC OPTOELECTRONICS TECHNOLOGY CORPORATION LIMITED, Chongqing (CN)

( * ) Notice: Subject to any disclaimer, the term of this patent is extended or adjusted under 35 U.S.C. 154(b) by 29 days.

(21) Appl. No.: 16/325,732

(22) PCT Filed: Feb. 27, 2017

(86) PCT No.: PCT/CN2017/075014
§ 371 (c)(1),
(2) Date: Feb. 15, 2019

(87) PCT Pub. No.: WO2018/120400
PCT Pub. Date: Jul. 5, 2018

(65) Prior Publication Data
US 2019/0204695 A1 Jul. 4, 2019

(30) Foreign Application Priority Data
Dec. 29, 2016 (CN) .......................... 2016 1 1254563

(51) Int. Cl.
*G02F 1/1335* (2006.01)
*G02F 1/1362* (2006.01)
(Continued)

(52) U.S. Cl.
CPC ...... *G02F 1/136209* (2013.01); *G02F 1/1368* (2013.01); *G02F 1/13394* (2013.01);
(Continued)

(58) Field of Classification Search
CPC ......... G02F 1/136209; G02F 1/133512; G02F 1/133514; G02F 1/1368; G02F 1/133516;
(Continued)

(56) References Cited

U.S. PATENT DOCUMENTS

2009/0040411 A1* 2/2009 Kawamura ........... G02F 1/1368
349/46
2010/0315573 A1* 12/2010 Hsieh .................. G02F 1/13394
349/61
(Continued)

FOREIGN PATENT DOCUMENTS

| CN | 102681249 A | 9/2012 |
|---|---|---|
| CN | 103149741 A | 6/2013 |

(Continued)

OTHER PUBLICATIONS

Shixing Yang, the ISA written comments. Sep. 2017, CN.
Shiang Yang, the International Searching Report Sep. 2017, CN.

*Primary Examiner* — Richard H Kim (57) ABSTRACT

The present disclosure provides a liquid crystal display panel and a manufacturing method thereof. The manufacturing method includes providing a first substrate and a second substrate; forming a color filter layer on the second substrate; forming a protective layer on the color filter layer; removing a portion of the protective layer; installing a first photo spacer and a second photo spacer on the protective layer, where the first photo spacer is disposed on a partial region of removing the protective layer; forming a liquid crystal layer between the first substrate and the second substrate; and a first distance between a top of the first photo (Continued)

spacer and the first substrate is less than a second distance between a to of the second photo spacer and the first substrate.

20 Claims, 4 Drawing Sheets

(51) Int. Cl.
  *G02F 1/1368* (2006.01)
  *G02F 1/1339* (2006.01)
(52) U.S. Cl.
  CPC .. *G02F 1/133512* (2013.01); *G02F 1/133514* (2013.01); *G02F 1/133516* (2013.01); *G02F 1/1362* (2013.01); *G02F 2001/136222* (2013.01); *G02F 2201/50* (2013.01)
(58) Field of Classification Search
  CPC ............... G02F 1/13394; G02F 1/1362; G02F 2201/50; G02F 2001/136222
  See application file for complete search history.

(56) References Cited

U.S. PATENT DOCUMENTS

| | | | | |
|---|---|---|---|---|
| 2011/0156165 | A1* | 6/2011 | Jang | H01L 27/1255 257/389 |
| 2014/0176895 | A1* | 6/2014 | Park | G02F 1/1339 349/153 |
| 2016/0377915 | A1* | 12/2016 | Kim | G02F 1/13394 349/42 |
| 2017/0235396 | A1* | 8/2017 | Gong | G02F 1/13338 349/12 |

FOREIGN PATENT DOCUMENTS

| | | | | |
|---|---|---|---|---|
| CN | 103529591 | A * | 1/2014 | ......... G02F 1/33516 |
| CN | 105988249 | A | 10/2016 | |
| CN | 106094358 | A | 11/2016 | |
| KR | 20080000083 | A | 1/2008 | |
| TW | 201324001 | A | 6/2013 | |

* cited by examiner

LIQUID CRYSTAL DISPLAY PANEL HAVING PHOTO SPACER AND MANUFACTURING METHOD THEREOF

This application claims priority to Chinese Patent Application No. CN 2016112545639, filed with the Chinese Patent Office on Dec. 29, 2016 and entitled "LIQUID CRYSTAL DISPLAY PANEL AND MANUFACTURING METHOD THEREOF", which is incorporated herein by reference in its entirety.

TECHNICAL FIELD

The present disclosure relates to the technical field of displays, and particularly relates to a liquid crystal display panel using the removal of a protective layer to mismatch distances between photo spacers (PS) and the substrate, and a manufacturing method thereof.

BACKGROUND

Many different display apparatuses, such as liquid crystal display apparatuse (LCD apparatuse) or electro luminenscence (EL) display apparatuse, are widely used in flat panel displays. In taking the LCD apparatuses as an example, most of the LCDs are backlit LCD apparatuses, each including a liquid crystal display panel and a backlight module. The liquid crystal display panel is composed of two transparent substrates and a liquid crystal enclosed between the substrates.

R/G/B color filters and photo spacers (PS) of existing upper-panel color filter are manufactured on one side of an array substrate. Distance between the photo spacers (PS) and substrate are not easy to be mismatched, causing images to easily form dark fringes during pressing. Therefore, boxing quality is influenced and various traces are formed due to nonuniform brightness of the display apparatus.

SUMMARY

A technical problem to be solved by the present disclosure is to provide a liquid crystal display panel, to avoid dark fringes in images. The liquid crystal display panel includes:
a first substrate, a second substrate including an active switch array and a color filter layer formed on the active switch array, a protective layer formed on the color filter layer, wherein at least one portion of the protective layer is removed, a liquid crystal layer formed between the first substrate and the second substrate, and a plurality of photo spacers positioned on the color filter layer, wherein at least one portion of the photo spacers are disposed on a partial region for removing the protective layer.

Optionally, the protective layer has different thicknesses.

Optionally, a portion of the color filter layer is exposed from the partial region for removing the protective layer.

Optionally, the plurality of photo spacers have the same length.

Optionally, the area of the partial region for removing the protective layer is less than 10% of the area of a full region of the protective layer.

Optionally, the color filter layer is provided with a color filter recess, and the region for removing the protective layer is formed on the color filter recess.

Optionally, there is a difference in height between the plurality of photo spacers.

Optionally, the distance between two adjacent photo spacers may be the same.

Optionally, the distance between two adjacent photo spacers may have difference.

Optionally, the display panel further includes a black matrix. The black matrix is between the first substrate and the photo spacers. There is a difference in height between the black matrix, lead to difference in height between corresponding of the two photo spacers.

Optionally, the photo spacers including a first photo spacer and a second photo spacer.

The second photo spacers, mismatched with the first photo spacer, the second photo spacers and the black matrix have equal height.

Optionally, the photo spacers including a first photo spacer and a second photo spacer, the second photo spacers mismatched with the first photo spacer.

Optionally, the first substrate further includes a first glass substrate, and the first glass substrate is provided with protrusions on the first photo spacer or the second photo spacer. A height difference is formed between the two photo spacers by using the protrusions.

Optionally, a height difference between the of the first photo spacers and the second height of the second photo spacers is greater than or equal to 0.5 um.

Optionally, a second substrate further includes a second glass substrate, the color filter layer positioned between the second glass substrate and the photo spacers. A height difference is formed between the color filter layer and the two photo spacers corresponding to the color filter layer.

Optionally, a second substrate further includes transparent conducting layer; the transparent conducting layer get through the region for removing the protective layer directly contact with a portion of the color filters of the color filter layer. The photo spacers dispose on the transparent conducting layer.

The present disclosure further provides a manufacturing method of the liquid crystal display panel. The manufacturing method comprises:
providing a first substrate and a second substrate,
forming an active switch array on the second substrate,
forming a color filter layer on the second substrate,
forming a protective layer on the color filter layer,
removing a portion of the protective layer,
installing a plurality of photo spacers on the protective layer, wherein at least one portion of the photo spacers are disposed on a partial region for removing the protective layer, and
forming a liquid crystal layer between the first substrate and the second substrate.

Optionally, the protective layers have different thicknesses.

Optionally, a portion of the color filter layer is exposed from the partial region for removing the protective layer.

Optionally, the display panel further comprises a black matrix, a height difference is formed between the black matrix and two adjacent photo spacers corresponding to the black matrix. The black matrix through use of a half tone mask.

Optionally, a height difference is formed between the color filter layer and the two adjacent photo spacers corresponding to the color filter layer through use of the half tone mask.

The present disclosure further provides a liquid crystal display panel. The liquid crystal display panel includes:
a first substrate,
a second substrate including an active switch array and a color filter layer formed on the active switch array, wherein the color filter layer comprises a plurality of different colors of color filters, and at least one portion of the color filters have different heights, a protective layer formed on the color filter layer, wherein at least one portion of the protective layer is removed, a liquid crystal layer formed between the first substrate and the second substrate, and a plurality of photo spacers positioned on the color filter layer, wherein at least one portion of the photo spacers are disposed on a partial region for removing the protective layer.

The plurality of photo spacers have the same length, a mismatch value exists among the plurality of photo spacers, and the mismatch value is greater than or equal to 0.5 um.

The protective layer has different thicknesses, a portion of the color filter layer is exposed from the partial region for removing the protective layer, and the area of the partial region for removing the protective layer is less than 10% of the area of a full region of the protective layer.

Mismatch may be formed between the two photos spacers by using color filters with different heights, to avoid influencing boxing quality due to dark fringes in images formed during pressing, thereby enhancing a display effect, realizing better display of the panel, enabling better viewing experiences for users, simultaneously saving costs and enhancing product competitiveness.

BRIEF DESCRIPTION OF DRAWINGS

The drawings included are used for providing further understanding of embodiments of the present application, constitute portion of the description, are used for illustrating implementation manners of the present application, and interpreting principles of the present application together with text description. Apparently, the drawings in the following description are merely some embodiments of the present application, and for those of ordinary skill in the art, other drawings can also be obtained according to the drawings without contributing creative labor. In the drawings.

DETAILED DESCRIPTION

Specific structure and function details disclosed herein are only representative and are used for the purpose of describing exemplary embodiments of the present disclosure. However, the present disclosure may be specifically achieved in many alternative forms and shall not be interpreted to be only limited to the embodiments described herein.

It should be understood in the description of the present disclosure that terms such as "central", "horizontal", "upper", "lower", "left", "right", "vertical", "horizontal", "top", "bottom", "inner", "outer", etc. indicate direction or position relationships shown based on the drawings, and are only intended to facilitate the description of the present disclosure and the simplification of the description rather than to indicate or imply that the indicated device or assembly must have a specific direction or constructed and operated in a specific direction, and therefore, shall not be understood as a limitation to the present disclosure. In addition, the terms such as "first" and "second" are only used for the purpose of description, rather than being understood to indicate or imply relative importance or hint the number of indicated technical features. Thus, the feature limited by "first" and "second" can explicitly or impliedly comprise one or more features. In the description of the present disclosure, the meaning of "a plurality of" is two or more unless otherwise specified. In addition, the term "comprise" and any variant are intended to cover non-exclusive inclusion.

It should be noted in the description of the present disclosure that, unless otherwise specifically regulated and defined, terms such as "installation", "bonded" and "bonding" shall be understood in broad sense, and for example, may refer to fixed bonding or detachable bonding or integral bonding, may refer to mechanical bonding or electrical bonding, and may refer to direct bonding or indirect bonding through an intermediate medium or inner communication of two assemblies. For those of ordinary skill in the art, the meanings of the above terms in the present disclosure may be understood according to specific conditions.

The terms used herein are intended to merely describe specific embodiments, not to limit the exemplary embodiments. Unless otherwise noted clearly in the context, singular forms "one" and "single" used herein are also intended to comprise plurals. It should also be understood that the terms "comprise" and/or "include" used herein specify the existence of stated features, integers, steps, operation, units and/or assemblies, not excluding the existence or addition of one or more other features, integers, steps, operation, units, assemblies and/or combinations of these.

The present disclosure will be further described in detail below in combination with the drawings and optional embodiments.

Figure 1:
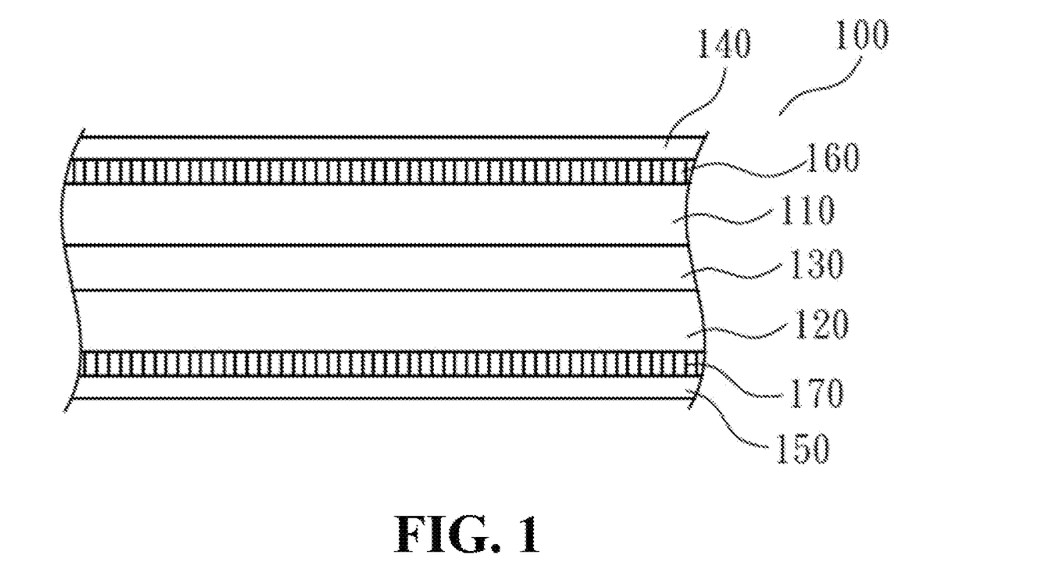
FIG. 1 is a local sectional schematic diagram of a liquid crystal display panel of an embodiment of the present disclosure.

FIG. 1 is a local sectional schematic diagram of a liquid crystal display panel of an embodiment of the present disclosure. The liquid crystal display apparatus includes a liquid crystal display panel 100 and a backlight module (not shown). The liquid crystal display panel 100 is arranged relative to the backlight module. The backlight module may be a side lighting backlight module or a bottom lighting backlight module, to provide backlight to the liquid crystal display panel 100. The liquid crystal display panel 100 may be a VA liquid crystal display panel.

As shown in FIG. 1, the liquid crystal display panel 100 includes a first substrate 110, a second substrate 120, a liquid crystal layer 130, a first polarizer 140, a second polarizer 150, and phase difference films 160, 170. The liquid crystal layer 130 is formed between the first substrate 110 and the second substrate 120, i.e., the liquid crystal layer 130 is positioned on an inner side of the first substrate 110 and an inner side of the second substrate 120. The first polarizer 140 is disposed on an outer side of the first substrate 110. The second polarizer 150 is disposed on an outer side of the second substrate 120. The phase difference film 160 is positioned between the first substrate 110 and the first polarizer 140. The phase difference film 170 is positioned between the second substrate 120 and the second polarizer 150.

As shown in FIG. 1, the first substrate 110 and the second substrate 120 may be made of glass substrates or flexible plastic substrates. It is worth noting that a color filter and an active switch (such as TFT) array can be configured on the same substrate in the embodiment of the present disclosure.

The structural schematic diagram of the display panel of the embodiment of the present disclosure is described below with reference to FIG. 2 to FIG. 5. The display panel includes a first substrate and a second substrate. A plurality of photo spacers 1 for supporting the first substrate and the second substrate are positioned between the first substrate and the second substrate. The photo spacers 1 are spacedly arranged, and at least two of the photo spacers have a first photo spacer and a second photo spacers mismatched with the first photo spacer. Mismatch may be formed between the two photo spacers 1, to avoid influencing boxing quality due to dark fringes in images formed during pressing, thereby enhancing a display effect, realizing better display of the panel, enabling better viewing experiences for users, simultaneously saving costs and enhancing product competitiveness.

Figure 2:
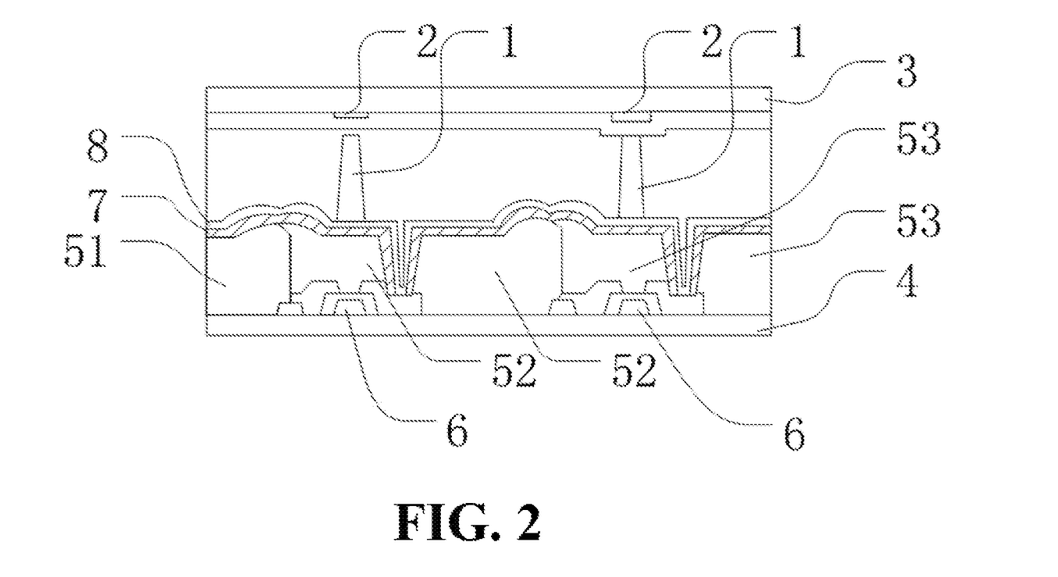
FIG. 2 is a structural schematic diagram of a liquid crystal display panel of an embodiment of the present disclosure.

In one or more embodiments of the present disclosure, the display panel further includes a black matrix 2. The black matrix 2 is positioned between the first substrate and the photo spacers 1. There is a difference in height between the black matrix 2 and a corresponding one of the two photo spacers 1. Accordingly, mismatch is formed between the two photo spacers 1. Heights of the black matrix 2 are varied, to allow height between the black matrix and the corresponding photo spacers to be mismatched, thereby avoiding influencing boxing quality due to dark fringes in images formed during pressing.

Specifically, FIG. 2 shows a structural schematic diagram of the display panel of an embodiment of the present disclosure. Through use of a half tone mask, a height difference is formed between the black matrix 2 and two adjacent photo spacers 1 corresponding to the black matrix. Accordingly, mismatch is formed between the two adjacent photo spacers 1. The mismatch is formed between the two adjacent photo spacers 1, so that uniform arrangement of the mismatch is used to increase a liquid crystal margin, effectively avoiding formation of dark fringes in images and ensuring the display panel quality. Of course, in addition to mismatch between the two adjacent photo spacers 1, the mismatch can also exist between the photo spacers 1, and distances in spacer may be uniform or in other specific sequences, and a difference value of the mismatch may be constant or variable.

The height difference is formed between the black matrix 2 and two adjacent photo spacers 1 corresponding to the black matrix through use of the half tone mask. By using a grey mask or the half tone mask, two exposure processes are combined into one working procedure, thereby saving one exposure process, shortening a production cycle, increasing production efficiency, reducing production costs and enhancing market competitiveness. Partial light transmission of a grating is used in the grey mask or the half tone mask, so that a color filter is not completely exposed. How many light rays of the light transmission is determined by a semi-permeable membrane portion according to the height difference of a required passivation layer, and generally, the transmittance is about 35% of that of a normal portion.

Figure 3:
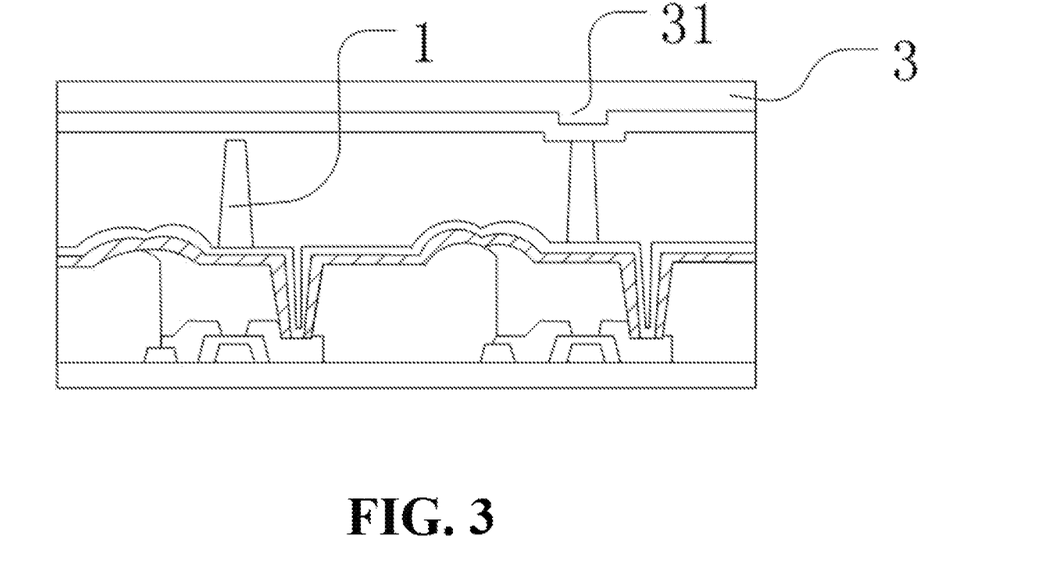
FIG. 3 is a structural schematic diagram of a liquid crystal display panel of an embodiment of the present disclosure.

As shown in FIG. 3, in one or more embodiments of the present disclosure, the first substrate further includes a first glass substrate 3, and the first glass substrate 3 is provided with protrusions 31 that protrusion inwards on the first photo spacer or the second photo spacer corresponding to the protrusions of the first glass substrate. A height difference is formed between the two photo spacers by using the protrusions 31. Accordingly, the mismatch is formed between the two photo spacers. Structures of the protrusions 31 on the first glass substrate 3 are used, and the protrusions 31 are arranged simply, to allow the distance between the first glass substrate and the corresponding photo spacers (PS) 1 to be mismatched, thereby avoiding influencing boxing quality due to dark fringes in images formed during pressing. Of course, the first glass substrate 3 can be provided with protrusions 31 to protrusion inwards on the first photo spacer and the second photo spacer corresponding to the protrusions of the first glass substrate, but the protrusions 31 corresponding to the two photo spacers 1 have different heights.

Specifically, a height difference is formed between the protrusions 31 and the two adjacent photo spacers 1 corresponding to the protrusions of the first glass substrate. Accordingly, mismatch is formed between the two adjacent photo spacers 1. The mismatch is formed between the two adjacent photo spacers 1, so that uniform arrangement of the mismatch is thoroughly used for increasing a liquid crystal margin, effectively avoiding formation of dark fringes in images and ensuring the display panel quality. Of course, in addition the mismatch between the two adjacent photo spacers 1, the mismatch can also exist between the photo spacers 1, and distances in spacer may be uniform or may be in other specific sequences, wherein a difference value of the mismatch may be constant or variable.

Specifically, FIG. 3 shows a structural schematic diagram of the display panel of an embodiment of the present disclosure. Height of one protrusion 31 in the two adjacent protrusions 31 is 0. The two adjacent photo spacers 1 correspondingly disposed on the first glass substrate 3, and the inner side of first glass substrate 3 is provided with a protrusion 31 corresponding to the first photo spacer, and the inner side of first glass substrate is not provided with a protrusion 31 corresponding to the second photo spacer, to allow height between the first glass substrate and the corresponding photo spacers to be mismatched.

More specifically, the second substrate of the liquid crystal display panel includes an active switch array and a color filter layer formed on the active switch array. The liquid crystal layer is formed between the first substrate and the second substrate. A plurality of photo spacers 1 are positioned between the first substrate and the second substrate, wherein one portion of the photo spacers 1 are positioned between the color filter layer and the protrusions 31 of the first glass substrate, to support the first substrate and the second substrate. The other one portion of the photo spacers 1 are positioned between the color filter layer and the protrusions 31 of the first glass substrate, thereby forming a mismatch between the photo spacers 1.

In one or more embodiments, the plurality of photo spacers 1 may have the same length, while the protrusions 31 are used for forming the mismatch. Therefore, the photo spacers 1 can be formed without the use of a special mask (e.g., half tone mask), thereby reducing the costs.

In one or more embodiments, the length of the plurality of photo spacers are slightly less than a distance between the color filter layer and the protrusions. Therefore, a portion of the photo spacers 1 can be supported between the color filter layer and the protrusions.

In one or more embodiments, the first substrate includes a glass substrate, and the protrusions are integrally formed on the glass substrate.

Figure 4:
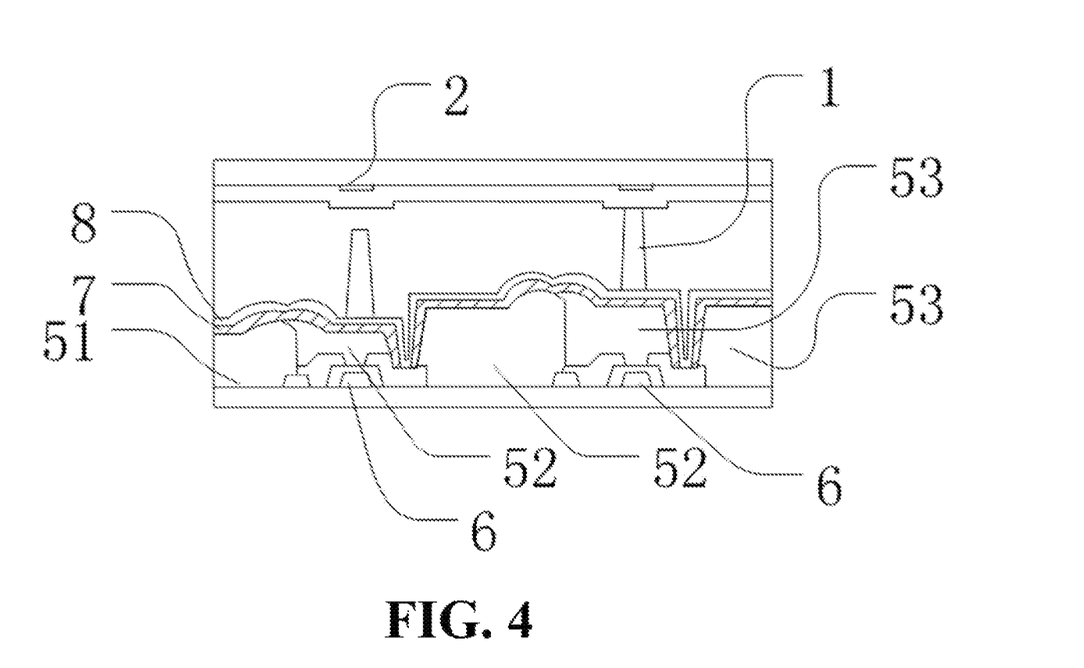
FIG. 4 is a structural schematic diagram of a liquid crystal display panel of an embodiment of the present disclosure.

In one or more embodiments of the present disclosure, the second substrate further includes a second glass substrate 4 and a color filter layer positioned between the second glass substrate 4 and the photo spacers 1. A height difference is formed between the color filter layer and the two photo spacers 1 corresponding to the color filter layer. Accordingly, mismatch is formed between the two photo spacers 1. Heights of the color filter are varied the photo spacers (PS) 1 are manufactured on the color filter. After the photo spacers (PS) 1 are formed, the mismatch is formed by using the topographic advantage, thereby avoiding influencing boxing quality due to dark fringes in images formed during pressing.

Specifically, a height difference is formed between the color filter layer and the two adjacent photo spacers 1 corresponding to the color filter layer. Accordingly, mismatch is formed between the two adjacent photo spacers 1. The mismatch is formed between the two adjacent photo spacers 1, so that uniform arrangement of the mismatch is thoroughly used for increasing a liquid crystal margin, effectively avoiding formation of the dark fringes in the images and ensuring the display panel quality. Of course, in addition to the mismatch between the two adjacent photo spacers 1, the mismatch can also exist between the photo spacers 1, and spacer distances may be uniform or may be in other specific sequences, wherein a difference value of the mismatch may be constant or variable.

Specifically, FIG. 4 shows a structural schematic diagram of the display panel of an embodiment of the present disclosure. The color filter layer includes an R color filter 51, G color filters 52 and a B color filter. Two adjacent G color filters 52 form the height difference through use of the half tone mask. Accordingly, the mismatch is formed between the photo spacers 1 disposed on the G color filters 52 and the B color filter 53, to effectively solve the dark fringes in the images.

Specifically, a height difference is formed between the color filter layer and the two adjacent photo spacers 1 corresponding to the color filter layer through use of the half tone mask. By using a grey mask or the half tone mask, two exposure processes are combined into one working procedure, thereby saving one exposure process, shortening a production cycle, increasing production efficiency, reducing production costs and enhancing market competitiveness. A portion of light transmission of a grating is used in the half tone mask, so that a color filter is exposed not completely. The light transmission quantity of light rays is determined by a semi-permeable membrane portion according to the height difference of a required passivation layer, and generally, the transmittance is about 35% of that of a normal part.

More specifically, a second substrate includes an active switch array and a color filter layer formed on the active switch array. The color filter layer includes a plurality of different colors of color filters 51, 52 and 53 and at least one portion of the color filters have different heights. For example, the color filter 52 in FIG. 4 have different heights, wherein at least one portion of the color filters are formed by using the grey mask or the half tone mask, to form the color filter with different heights.

More specifically, the manufacturing method of the liquid crystal display panel includes:

providing a first substrate and a second substrate, forming an active switch array on the second substrate, successively forming a plurality of different colors of color filters on the second substrate, to form the color filter layer, wherein at least one portion of the color filters are formed by using the grey mask or the half tone mask, to form the color filter with different heights, installing a plurality of photo spacers on the color filter layer, and forming a liquid crystal layer between the first substrate and the second substrate.

In one or more embodiments, the color filter of the same color has different heights. For example, the color filter 52 may have a first height and a second height, the first height is different from the second height, and a height difference between the first height and the second height is greater than or equal to 0.5 um.

In one or more embodiments, the color filters of different colors have different heights. For example, the color filter 51 has a first height, the color filter 52 has a second height, the first height is different from the second height and a height difference between the first height and the second height is greater than or equal to 0.5 um.

In one or more embodiments, the plurality of photo spacers 1 may have the same length, while the color filters 51, 52 and 53 with different heights are used to form the mismatch. Therefore, the photo spacers 1 can be formed without the use of a special mask (e.g., half tone mask), thereby reducing the costs.

Figure 5:
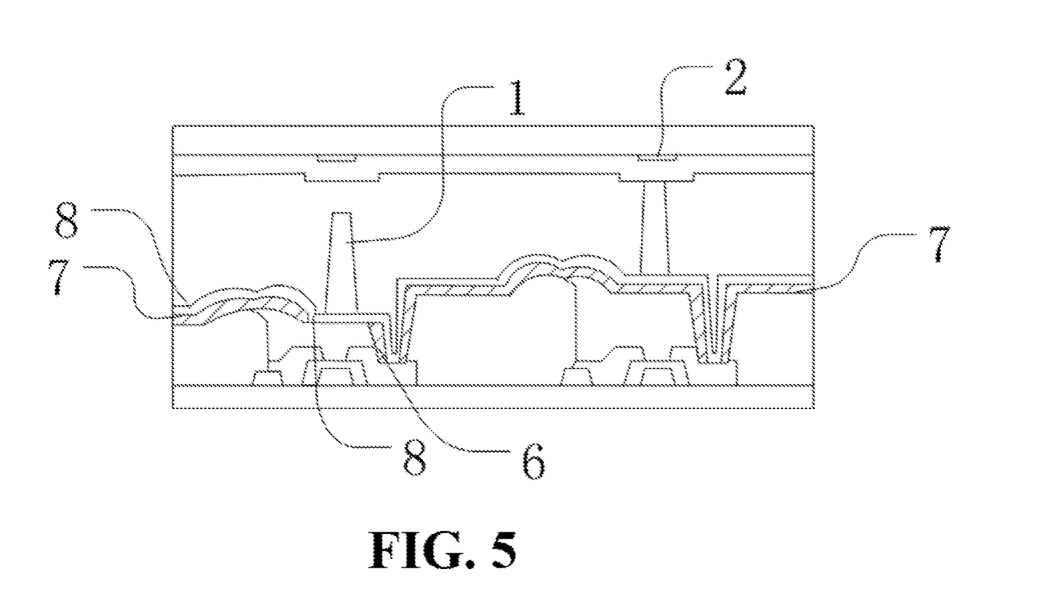
FIG. 5 is a structural schematic diagram of a liquid crystal display panel of an embodiment of the present disclosure.

In one or more embodiments of the present disclosure, the second substrate further includes a second glass substrate 4 and a color filter layer positioned between the second glass substrate 4 and the photo spacers 1. A protective layer 7 is positioned between the color filter layer and the photo spacers 1. A height difference is formed between the protective layer 7 and the two photo spacers 1 corresponding to the protective layer. Accordingly, mismatch is formed between the two photo spacers 1. The protective layers 7 under the photo spacers (PS) 1 have different thicknesses. The photo spacers (PS) 1 are manufactured on the protective layer 7. After the photo spacers (PS) 1 are formed, the mismatch is formed by using the topographic advantage, thereby avoiding influencing boxing quality due to dark fringes in images formed during pressing.

Specifically, a height difference is formed between the protective layer 7 and the two adjacent photo spacers 1 corresponding to the protective layer. Accordingly, mismatch is formed between the two adjacent photo spacers 1. The mismatch is formed between the two adjacent photo spacers 1, so that uniform arrangement of the mismatch is thoroughly used to increase a liquid crystal margin, effectively avoiding formation of the dark fringes in the images and ensuring the display panel quality. Of course, in addition to the mismatch between the two adjacent photo spacers 1, the mismatch can also exist between the photo spacers 1, and spacer distances may be uniform or may be in other specific sequences, wherein a difference value of the mismatch may be constant or variable.

Specifically, a height of the color filter layers corresponding to the first photo spacers 1 and a height of the color filter layers corresponding to the second photo spacers 1 are same. A conducting layer is positioned between the first photo spacer and the corresponding color filter layer. The conducting layer and the protective layer are positioned between the second photo spacer and the corresponding color filter layer. The protective layer 7 under the corresponding photo spacer (PS) 1 is directly removed to mismatch, which is simple in step, wherein thin film transistors 6 are also disposed on the second substrate, and the first photo spacer and the second photo spacer are respectively arranged above the two adjacent thin film transistors 6. The thin film transistors 6 are compositions formed by stacking a plurality of polygons as shown in the figure, and the conducting layer 8 is connected to drains of the thin film transistors 6, wherein the color filter layers corresponding to the two photo spacers 1 have different colors.

Specifically, besides that the protective layer 7 corresponding to the photo spacers can only be removed, to allow distance between the photo spacers 1 and the corresponding protective layer to be mismatch, the mismatch can also be formed more adequately in such a manner that the color filter is processed through use of the half tone mask, to form the height difference between the two photo spacers and the color filter. FIG. 5 shows a structural schematic diagram of the display panel of an embodiment of the present disclosure. The color filter layer includes an R color filter 51, G color filters 52 and a B color filter. Two adjacent G color filters 52 form the height difference through use of the half tone mask. Meanwhile, the protective layer 7 under one G color filter 52 is removed. Accordingly, the mismatch is formed between the photo spacers 1 disposed on the G color filters 52 and the B color filter 53, to effectively solve the dark fringes in the images.

More specifically, the protective layer 7 is formed on the color filter layer, wherein at least one portion of the protective layer 7 is removed (as shown in FIG. 5). At least one portion of the photo spacers are disposed on a partial region for removing the protective layer, to form a height difference between the photo spacers 1 and the protective layer.

In one or more embodiments, by removing at least one portion of the protective layer 7, the protective layer 7 has different thicknesses, to form the height difference between the photo spacers 1 and the protective layer.

In one or more embodiments, portion of the color filter layer is exposed from the partial region for removing the protective layer 7. Specifically, a portion of the color filter layer is exposed from the partial region for removing the protective layer 7, so that the transparent conducting layer 8 is directly contact with a portion of the color filters of the color filter layer.

In one or more embodiments, the plurality of photo spacers have the same length, while the removal of the protective layer 7 is used to form the mismatch. Therefore, the photo spacers 1 can be formed without the use of a special mask (e.g., Half Tone Mask), thereby reducing the costs.

In one or more embodiments, the area of the partial region for removing the protective layer 7 is less than 10% of the area of a full region of the protective layer 7, to avoid influencing a normal protection function of the protective layer 7.

More specifically, the manufacturing method of the liquid crystal display panel includes:
 providing a first substrate and a second substrate,
 forming an active switch array on the second substrate,
 forming a color filter layer on the second substrate,
 forming a protective layer 7 on the color filter layer,
 removing portion of the protective layer 7,
 installing a plurality of photo spacers 1 on the protective layer 7, wherein at least one portion of the photo spacers are disposed on a partial region for removing the protective layer, and
 forming a liquid crystal layer between the first substrate and the second substrate.

Figure 6:
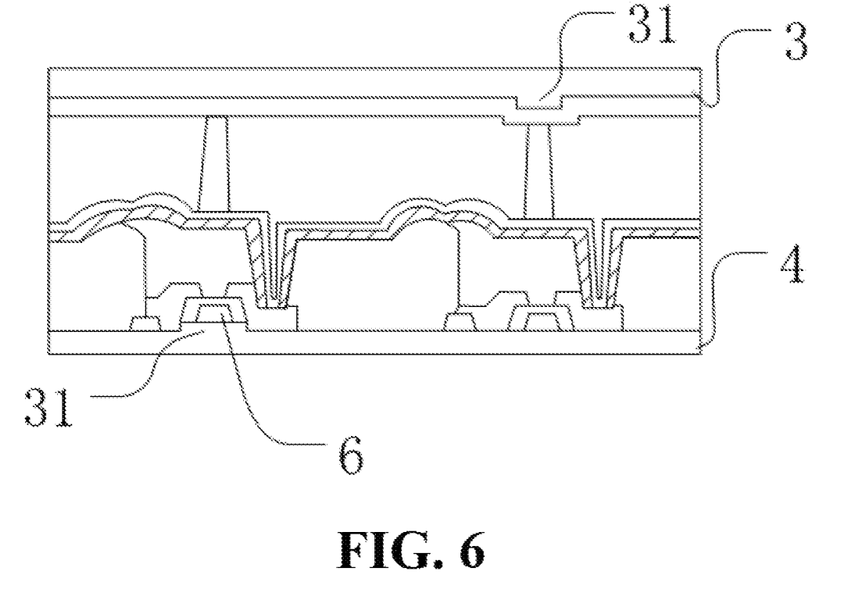
FIG. 6 is a structural schematic diagram of a liquid crystal display panel of an embodiment of the present disclosure.

In one or more embodiments of the present disclosure, contact surfaces of the first photo spacer and the second photo spacer with the first substrate have differences in height. Contact surfaces of the first photo spacer and the second photo spacer with the second substrate have differences in height. Accordingly, mismatch is formed between the two photo spacers 1. The mismatch is formed in both of two substrate directions, and the mismatch can be increased for the convenience of successfully manufacturing the entire display panel, thereby avoiding influencing a display of the display panel due to a limited mismatch value.

Specifically, FIG. 6 shows a structural schematic diagram of the display panel of an embodiment of the present disclosure. The first glass substrate 3 forms the protrusion 31 corresponding to one of the photo spacers 1, and the second glass substrate 4 forms the protrusion 31 corresponding to the other one of the photo spacers 1, so that the two photo spacers 1 are mismatched with a greater difference value. Of course, in addition to the manner that the glass substrate is inwards provided with the protrusions 31, other manners can also be adopted. The manners adopted on one side of the first substrate and on one side of the second substrate may be also different.

A photo initiator in each photo spacer 1 is same. The same photo initiator is arranged in different photo spacers 1. Irradiated by different wavelengths of light rays, the different photo spacers 1 produce different degrees of cross-linking reactions, thereby achieving that different photo spacers 1 are mismatched. The different wavelengths of the light rays are used for irradiating the same photo initiator and the photo spacers 1. The different photo spacers 1 are controlled to produce different degrees of the cross-linking reactions under the effect of the light rays of different wavelengths, to further control the shrinkage of the different photo spacers 1. Control effect is good, so that the mismatch between the different photo spacers 1 achieves a preset need. In addition, for such configuration on a production technology, the different photo spacers 1 are not required to be configured differently, and the configuration is simple.

Figure 7:
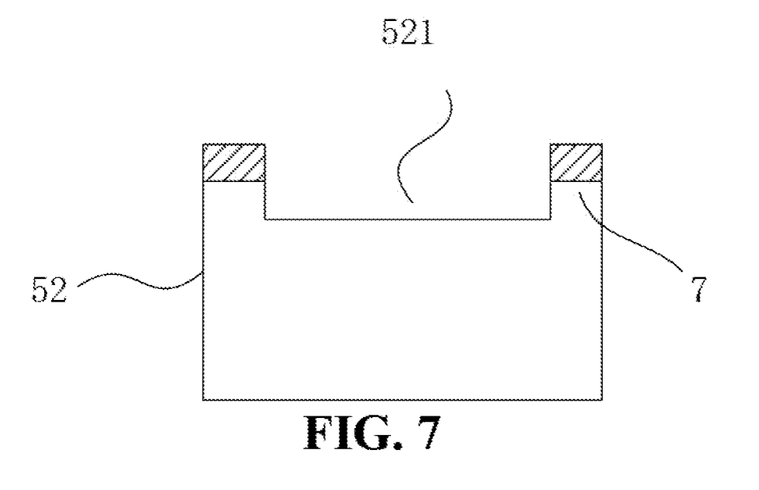
FIG. 7 is a structural schematic diagram of a color filter and a protective layer of an embodiment of the present disclosure.

FIG. 7 shows a structural schematic diagram of the color filter and the protective layer of an embodiment of the present disclosure. In one or more embodiments, the color filter layer is provided with a recess 521, and the region for removing the protective layer 7 is formed on the color filter recess 521, i.e., the protective layer 7 is not arranged in the color filter recess 521, to mismatch with a greater difference value between the photo spacers 1.

Specifically, the black matrix 2 and the second photo spacer is configured to have the same height, the first photo spacer is higher than the second photo spacer, and the second photo spacer is positioned between the first photo spacer and the black matrix 2. It is better that the first photo spacer is configured to be higher than the second photo spacer and the black matrix 2, the second photo spacer is configured to have an equal height to the black matrix 2, and the heights of the first photo spacer, the second photo spacer and the black matrix 2 are controlled, i.e., the control for the mismatch is better, so that the display of the display panel is better.

The mismatch value between the first photo spacer and the second photo spacer is greater than or equal to 0.5 um. Specifically, the height difference between the height H1 of the first photo spacer and the height H2 of the second photo spacer is greater than or equal to 0.5 um. When the mismatch value between the first photo spacer and the second photo spacer is less than 0.5 um, there is a large a display influence on the display panel, and other manufacturing processes are influenced, so the difficulty of the entire display panel is increased. The shrinkage among the different photo spacers is controlled under the coordination of the light rays of different wavelengths and the photo initiator, to control the mismatch between the first photo spacer and the second photo spacer to be greater than or equal to 0.5 um, thereby facilitating successful manufacturing of the entire display panel and avoiding influencing display of the display panel due to a limited mismatch value.

According to another aspect of the present disclosure, the present disclosure further discloses a display apparatus including the backlight module and the above display panel.

As still another embodiment of the present disclosure, the present embodiment discloses the backlight module and the display panel of the display device. See FIG. 1 to FIG. 4 for specific structures and bonding relationships of the display panel, which will not be described in detail herein.

The above contents are further detailed descriptions of the present disclosure in combination with specific preferred embodiments. However, the specific implementation of the present disclosure shall not be considered to be only limited to these descriptions. For those of ordinary skill in the art to which the present disclosure belongs, several simple deductions or replacements may be made without departing from the conception of the present disclosure, all of which shall be considered to belong to the protection scope of the present disclosure.

What is claimed is:

1. A liquid crystal display panel, comprising:
a first substrate;
a second substrate comprising an active switch array and a color filter layer formed on the active switch array;
a protective layer formed on the color filter layer, wherein at least one portion of the protective layer is removed;
a liquid crystal layer formed between the first substrate and the second substrate; and
a first photo spacer and a second photo spacer positioned on the color filter layer, wherein the first photo spacer is disposed on a region of removing the protective layer;
a protrusion disposed on the first substrate corresponding to the second photo spacer, wherein a first distance between a top of the first photo spacer and the first substrate is less than a second distance between a top of the second photo spacer and the first substrate.

2. The liquid crystal display panel according to claim 1, wherein the protective layer has different thicknesses in different regions.

3. The liquid crystal display panel according to claim 1, wherein a portion of the color filter layer is exposed from the region of removing the protective layer.

4. The liquid crystal display panel according to claim 1, wherein the plurality of photo spacers have a same length.

5. The liquid crystal display panel according to claim 1, wherein an area of region of removing the protective layer is less than 10% of an area of a full region of the protective layer.

6. The liquid crystal display panel according to claim 1, wherein the color filter layer is provided with a color filter recess, and the region of removing the protective layer is formed on the color filter recess.

7. The liquid crystal display panel according to claim 1, wherein, the display panel further comprises a black matrix, the black matrix is disposed between the first substrate and the photo spacers, there is a height difference between two adjacent black matrices.

8. The liquid crystal display panel according to claim 1, wherein the protective layer in the region of removing the protective layer is completely removed, and the first photo spacer directly contacts with the color filter layer.

9. The liquid crystal display panel according to claim 8, wherein a transparent conducting layer is disposed on the protective layer to directly contact with the color filter in the region of removing the protective layer, and the first photo spacer is disposed on the transparent conducting layer.

10. The liquid crystal display panel according to claim 1, wherein a protrusion is disposed on the second substrate corresponding to the first photo spacer.

11. The liquid crystal display panel according to claim 10, wherein the protrusion is disposed under the active switch array.

12. The liquid crystal display panel according to claim 1, wherein the color filter comprises an R color filter, a G color filter, and a B color filter the first photo spacer is disposed on the G color filter and the second photo spacer is disposed on the B color filter, and a height difference is formed between the G color filter and the B color filter.

13. The liquid crystal display panel according to claim 12, wherein the G color filter comprises a higher portion and a lower portion formed by half tone mask, the photo spaces are disposed on the lower portion.

14. The liquid crystal display panel according to claim 12, wherein a height of the G color filter is less than a height of the B color filter, a conducting layer is disposed on the protective layer, and the protective layer on the G color filter is removed corresponding to the first photo spacer, the conducting layer on the G color filter is removed at a position corresponding where the protective layer is removed directly contacts with the G color filter, and the protective layer on the B color filter corresponding to the second photo spacer is reserved.

15. The liquid crystal display panel according to claim 14, wherein the second photo spacer corresponding to the B color filter does not contact with the first substrate.

16. The liquid crystal display panel according to claim 1, wherein the two adjacent first and second photo spacers corresponding to the black matrix are formed by half tone mask and a transmittance of the half tone mask is 35%.

17. A manufacturing method of a liquid crystal display panel, comprising:
providing a first substrate and a second substrate;
forming an active switch array on the second substrate;
forming a color filter layer on the second substrate;
forming a protective layer on the color filter layer;
removing portion of the protective layer;
installing a first photo spacer and a second photo spacer on the protective layer; the first photo spacer disposed on a region of removing the protective layer;
forming a protrusion on the first substrate corresponding to the second photo spacer, wherein a first distance between a top of the first photo spacer and the first substrate is less than a second distance between a top of the second photo spacer and the first substrate; and
forming a liquid crystal layer between the first substrate and the second substrate.

18. The manufacturing method of the liquid crystal display panel according to claim 17, wherein the protective layer has different thicknesses in different regions.

19. The manufacturing method of the liquid crystal display panel according to claim 17, wherein a portion of the color filter layer is exposed from the region of removing the protective layer.

20. A liquid crystal display panel, comprising:
a first substrate;
a second substrate comprising an active switch array and a color filter layer formed on the active switch array, wherein the color filter layer comprises a plurality of different colors of color filters, and at least one portion of the color filters have different heights;

a protective layer formed on the color filter layer, wherein at least one portion of the protective layer is removed;
a liquid crystal layer formed between the first substrate and the second substrate; and
a first photo spacer and a second photo spacer positioned on the color filter layer, wherein the first photo spacer is disposed on a region of removing the protective layer;
a protrusion disposed on the first substrate corresponding to the second photo pacer, where a mismatch value exists between a first distance between a top of the first photo spacer and the first substrate and a second distance between a to of the second photo spacer and the first substrate, and the mismatch value is greater than or equal to 0.5 um,
wherein the protective layer has different thicknesses in different regions, and a portion of the color filter layer is exposed from the region of removing the protective layer, and the area of the region of removing the protective layer is less than 10% of the area of a full region of the protective layer;
wherein the color filter layer is provided with a color filter recess, and the region of removing the protective layer is formed on the color filter recess.

\* \* \* \* \*